(12) United States Patent
Guillemaud et al.

(10) Patent No.: US 6,343,143 B1
(45) Date of Patent: Jan. 29, 2002

(54) PROCESS FOR THE REGISTRATION OF TWO DIFFERENT IMAGES OF THE SAME OBJECT

(75) Inventors: Régis Guillemaud, Grenoble (FR); Sébastien Durbec, Zürich (CH)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/283,868

(22) Filed: Apr. 1, 1999

(30) Foreign Application Priority Data

Apr. 10, 1998 (FR) .............................. 98 04560

(51) Int. Cl.[7] .............................................. G06K 9/00
(52) U.S. Cl. ...................................... 382/130; 382/294
(58) Field of Search .............................. 382/294, 287, 382/295, 130, 131, 132; 364/413.13; 128/922; 129/920, 923

(56) References Cited

U.S. PATENT DOCUMENTS

| | | |
|---|---|---|
| 5,295,200 A | 3/1994 | Boyer |
| 5,581,638 A * | 12/1996 | Givens et al. .............. 382/294 |
| 5,709,206 A * | 1/1998 | Teboul ..................... 128/653.1 |
| 5,850,486 A * | 12/1998 | Maas, III et al. ........... 382/294 |
| 5,956,435 A * | 9/1999 | Buzug et al. ............... 382/283 |

OTHER PUBLICATIONS

G. Rizzo, et al., Proceedings of the Annual International Conference of the IEEE Engineering in Medicine and Biology Society, vol. 13, No. 1, pp. 219–220, "Multimodality Biomedical Image Integration: Use of a Cross–Correlation Technique", 1991.

* cited by examiner

*Primary Examiner*—Leo Boudreau
*Assistant Examiner*—Yosef Kassa
(74) *Attorney, Agent, or Firm*—Oblon, Spivak, McClelland, Maier & Neustadt, P.C.

(57) ABSTRACT

The invention relates to a process for the registration of two different images of the same object consisting of breaking down each of the images into space components representing the distribution of the grey levels of the image, applying a phase registration method to the components to bring about a correspondence between the components of one image with those of the other image, summating all the results of the bringing into correspondence and detecting, in the image resulting from said sum, the maximum grey level defining the transformation between the two initial images.

6 Claims, 3 Drawing Sheets

PROCESS FOR THE REGISTRATION OF TWO DIFFERENT IMAGES OF THE SAME OBJECT

FIELD OF THE INVENTION

The invention relates to a process for the registration of two different images of the same object and in particular two multimode images. It has applications in all fields requiring a superimposing of different images of the same object and particularly in the fields of non-destructive testing and medical imaging.

PRIOR ART

The exploitation of images often requires a superimposing thereof. Although these images generally represent the same object, they are not directly superimposable for different reasons, namely they can be taken at different times or using different acquisition systems.

In addition, even for images having equivalent geometrical structures (i.e. images containing elements of identical objects), the distribution of the grey levels on the two images to be superimposed can differ between individual images and reference is then made to multimode images.

In order to be simultaneously exploitable and in particular superimposable, such images must be brought into correspondence beforehand, i.e. brought into a geometrical reference marking common to both images. It is consequently necessary to determine the geometrical transformation making it possible to represent one of the images in the geometrical reference marking of the other image and this is called image registration.

In particular, image registration is necessary in medical imaging in order to permit the observation of the same part of the human body from which an image has been obtained, e.g. by a X-radiation scanner and another image is obtained e.g. by magnetic resonance imaging (MRI) or by single photon emission tomography (SPECT).

FIGS. 1A and 1B show two examples of images of a human brain. FIG. 1A shows an axial section of the brain in MRI and FIG. 1B an axial section of the brain in SPECT. These two images, with different scopes, are linked by a rigid transformation.

At present, several methods are known for the registration of two images of the aforementioned type.

Certain methods make the hypothesis that the grey level distributions are equivalent for the registration of the two images. The grey levels of the images are then directly used for calculating the off-set between the two images. Among these methods there is the intercorrelation method consisting of determining the maximum of a function of the transformation or a product in the frequency range.

However, these methods suffer from a major disadvantage, which is the fact that the noise in the images and certain local distortions can hide the correlation peak, which falsifies the results of the registration.

Moreover, as a result of the actual hypothesis made on the grey levels, these methods cannot be used for multimode images.

Certain of these registration methods are based on space or frequency moments of the images and make it possible to determine the location, orientation or change of size of an object in an image. However, even if in theory an image is completely described by all its moments, in practice the high order moments are very sensitive to noise and contour distortions.

In the case where the images are very noisy or the grey levels of the images differ excessively, or if the images are in different scopes, the registration algorithm of these methods is falsified and the registration of the images is incorrect.

Other registration methods are also known. These methods use a higher order information based on visual marks extracted from the images. For example, certain of these methods consist of isolating, in both images, points in direct correspondence. These points are either selected manually in each of the two images, or are selected by means of markers designating, prior to acquisition, certain reference points on the basis of which the images will be registered. The distance between these points is then progressively decreased by a registration algorithm based e.g. on a least squares regression, on a breaking down into 3D eigenvalues, or other known, mathematical methods. These methods can be used for contours, surfaces or any other group of points.

They have the advantage of permitting the handling of a reduced information quantity compared with that of the previously described methods, whilst still taking account of the introduction of a higher information. However, they suffer from the disadvantage of being dependent on the way in which the informations are revealed.

Moreover, the informations extracted from the two images must necessarily represent the same structures (elements of objects contained in images), particularly for multimode images. These methods can then be unstable with respect to modifications in the extracted informations, which leads to geometrical errors.

In particular, for acquired images (i.e. non-simulated), the extraction of informations is generally unstable and difficult, a change of parametrizing may completely change the solution found. For example, a threshold change in most cases modifies the structure of the object extracted from the image.

Another known method is the phase translation registration method, which is deduced from the Fourier transform properties with respect to the translation in the space range (DIGITAL IMAGE PROCESSING, W. K. PRATT, Ed. Wiley Interscience, p 12). In this method, $u(\vec{x})$ and $v(\vec{x})$ are respectively the two images considered, where $\vec{x}$ is the vector of the coordinates. If the two images are linked by a translation of vector $\vec{t}$, we obtain:

$$u(\vec{x}) = v(\vec{x} - \vec{t}).$$

By Fourier transform, where f represents the space coordinates, we then obtain:

$$U(\vec{f}) = |U(\vec{f})| \cdot e^{j\theta_u(\vec{f})} = |V(\vec{f})| \cdot e^{j\theta_u(\vec{f})} \cdot e^{j(\vec{t} \cdot \vec{f})} = V(\vec{f}) \times e^{j(\vec{t} \cdot \vec{f})}$$

Whilst only retaining the phases of the signals and forming their product are conjugacy of one of them, and taking the inverse transformation, we obtain:

$$\mathcal{F}^{-1}(e^{j(-\theta_u(\vec{f}) + \theta_u(\vec{f}) + \vec{t} \cdot \vec{f})}) = \mathcal{F}^{-1}(e^{j(\vec{t} \cdot \vec{f})}) = S_{\vec{t}}(\vec{x}).$$

It is then possible to observe a Dirac peak at $\vec{x} = \vec{t}$.

However, this method is firstly limited to images with the same scopes and then to translation-type transformations.

A method based on maximization of mutual information permits a registration of multimode images. Such a method is described in the document "Multimodality Image Registration by Maximization of Mutual Information" by MAES, CALLIGNON et al, IEEE Transactions on Medical Imaging, vol. April 16, 1997 or in the document "Multi-modal volume registration by maximization of mutual information", by WELLS et al, Medical Image Analysis, vol. 1, No. 1, pp 35–51, February 1996.

This method suffers from the disadvantage of requiring a large number of calculations, as well as an optimization algorithm in order to converge towards the solution, which leads to problems of non-constant calculating times and a risk of convergence towards a local minimum, which corresponds to a poor solution.

DESCRIPTION OF THE INVENTION

The object of the invention is to obviate the disadvantages of the previously described methods. It therefore proposes a process for the registration, in a quasi-constant time, of two different images, which can be multimode images. This method consists of breaking down each of the images into space components representing the distribution of the grey levels of the image, applying the phase registration method to the components for bringing about correspondence of the components of one image with those of the other image, summating all the results of the bringing into correspondence and detecting, in the image resulting from said summation, the maximum grey level defining the transformation between the two initial images.

More specifically, the invention relates to a process for determining a geometrical transformation between two different images I1 and I2, both representative of the same object, with a view to the superimposing thereof. This process is characterized in that it consists of:

E13) segmenting each of the images into different components and deducing therefrom for each image, a group of segmented images, E16) registering the thresholded images by a phase-based bringing into correspondence of each image:

16a) by taking, in the group of thresholded images corresponding to the image I1 and in the group of thresholded images corresponding to the image I2, respectively, a first and a second thresholded image components constituting the first and second components of a pair of components, 16b) carrying out a transform T for passing each component of the pair of the space range to a dual frequency range, 16c) calculating a phase image for each component of the pair, 16d) calculating, for each pair, a difference between the two phase images of the two components of the pair and deducing therefrom a phase difference image, 16e) determining the inverse transform $T^{-1}$ of the transform T of said phase difference image for determining an offset image and 16f) performing the stages 16a to 16e for each pair of components, E18) summating all the offset images obtained in 16e for determining a total offset image and E20) determining, in each total offset image, the pixel having the maximum value, the coordinates of said pixel fixing the parameters of the geometrical transformation between the two images I1 and I2.

According to a first embodiment of the invention, in which the geometrical transformation is a translation, stages 16b to 16e consist of applying an elementary Fourier transform.

According to a second embodiment of the invention, where the geometrical transformation is a rotation associated with a scale change, the stages 16b and 16e consist of applying the Fourier-Mellin transform to a group constituted by a rotation and a scale change and associating it with a Haar measure for determining the parameters of the rotation and the scale change.

According to a third embodiment of the invention, in which the geometrical transformation is a translation associated with a rotation, the stages 16b to 16e consist of applying an elementary Fourier transform associated with a rotation of the images.

In this embodiment:

successive registrations are applied to the two images carrying out successive rotations on one of the two images and mutually registering the same on each occasion by the translation phase method (cf. first embodiment), an offset image is determined for one translation and for each registration, the maximum value pixel in the group of offset images obtained for all the rotations is sought (the translation is determined by the position of the maximum pixel of the image containing it), the offset image containing this maximum being associated with a rotation, said rotation and the translation defining the geometrical transformation.

Advantageously, the process according to the invention consists of extending the phase difference images by a zero-padding method in order to increase the precision of the parameters determined in stage E20.

According to an embodiment of the invention, the segmentation E13 of the images takes place as a function of the grey levels of the images, said segmentation consisting of:

E12) determining, for each image, a histogram of the grey levels of the image and choosing, among said grey levels, n grey level thresholds for each image, with n>2, E14) breaking down each of the images as a function of its n grey level thresholds and deducing therefrom, for each image I1 and I2, a group of n−1 segmented images.

DETAILED DESCRIPTION OF THE EMBODIMENTS OF THE INVENTION

The invention relates to a process for registering two images of the same object, implemented by means of two different acquisition systems or a single acquisition system but at two different moments. The registration of these two images takes place by determining the geometrical transformation making it possible to bring the two images into the same reference marking so as to be able to superimpose them. This geometrical transformation involves:

breaking down each of the images into a plurality of space components representing the distribution of the grey levels of each image, bringing about the correspondence, by phase, of a component of each image for forming pairs of components and summating all the results of the bringing into correspondence, followed by the detection of the maximum grey level in the image resulting from said sum.

Figure 3:
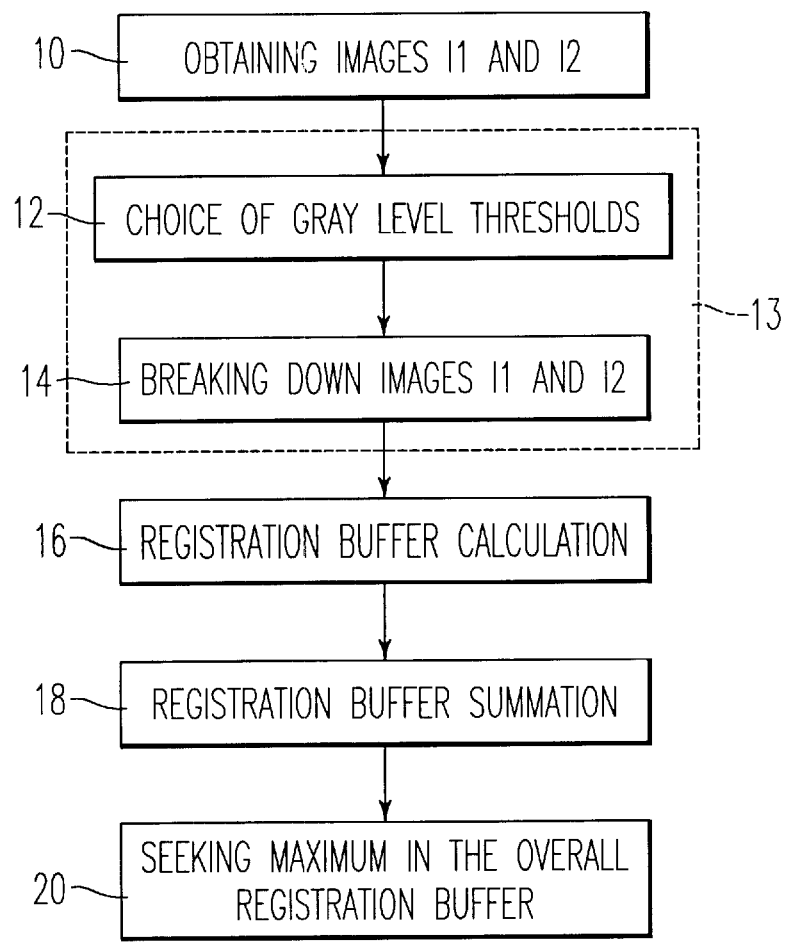
FIG. 3 shows the functional diagram of the process according to the invention.

More specifically, the process according to the invention involves the different stages shown in the functional diagram of FIG. 3.

The first stage of the process 10 is a stage for obtaining two images I1 and I2, each of said images being a group of pixels. These two images I1 and I2 can be obtained from a single acquisition device of identical images or from acquisition devices of different images. It is also possible for one of these images to be a simulated image or a model image, such as a map, e.g. in the case of the registration of a satellite image with a geographical map.

Stage 13 of the process according to the invention consists of segmenting each of the images into different components and deducing therefrom, for each image, a group of images segmented as a function of at least one of the components thereof.

Segmentation can take place as a function of the grey levels of the images, or as a function of the texture, colour, etc. of the images or automatically, as described in the document "Parameter Estimation and Tissue Segmentation from Multispectral Images", IEEE Trans. on Medical Imaging, Z. LIANG et al, vol. 13, No. 3, September 1994, pp 441–449.

According to a preferred embodiment of the invention, said segmentation takes place as a function of the grey levels of the images. In particular, said stage 13 consists of a stage 12 of choosing grey level thresholds for each of the images I1 and I2. In other words, independently for each of the images, said stage consists of choosing a certain number of grey level thresholds. Thus, n1 grey level thresholds will be chosen to define the image I1 and n2 grey level thresholds for defining the image I2. The grey level thresholds of an image are chosen in such a way that the pixels of said image between two thresholds are as representative as possible of the structure contained within the image, i.e. of the object represented on the image.

This choice of grey level thresholds more particularly takes place by constructing, for each of the images, a histogram of the grey levels of the image. This histogram is a function which, for each grey level of the image, indicates the number of pixels having this grey level. On the basis of the histogram of the grey levels of an image, one or more thresholds are chosen so as to permit the identification of structures, such as the object compared with the background of the image.

Figure 4:
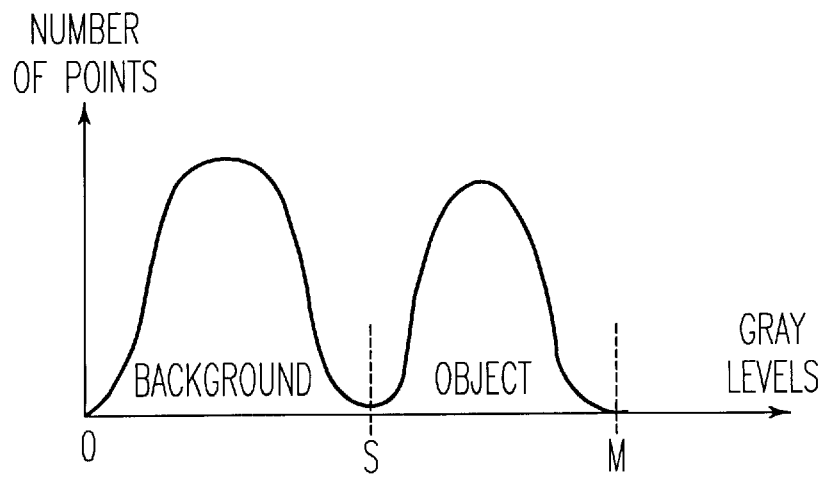
FIG. 4 shows an example of a histogram and the choice of grey level thresholds.

FIG. 4 shows an example of a histogram of the grey levels of an image showing a bright object on a dark background. As the grey levels of an image are a function of the number of pixels (or image points) having this grey level, the histogram of FIG. 4 shows a first peak representing the background of the image and a second peak representing the object, so that said histogram has two modes. In this example, a single threshold is chosen for breaking down the image. This threshold has as its value the centre of the two modes (each mode corresponding to a peak), designated S in FIG. 4. This threshold S is associated with two natural thresholds 0 and M, which are respectively the minimum and maximum values of the grey levels of the histogram. Thus, the three thresholds used here are:

the minimum value, in particular 0,
the threshold S corresponding to the centre of the two modes,
the maximum value on the image, called M.

The pixels of the grey levels between 0 and S are representative of the background of the image and the pixels of the grey levels between S and M are representative of the object in the image.

The thresholds can be defined by several different methods:

a manual approach in which the operator chooses the threshold, e.g. iteratively, a method in which the thresholds are, a priori, known for the image classes in question, e.g. when the values of the images correspond to physical quantities, as is the case for X-scanners, calculating methods for automatically calculating the number of thresholds to be used, as well as the values of the thresholds, e.g. on the basis of histogram mode studies or an iterative algorithm, the threshold then being defined as the value of the grey level where the two closest Gaussian points intersect.

This method of determining the number of thresholds by modelling a histogram in the form of a Gaussian sum is described by Z. LIANG, J. R. MacFALL, D. P. HARRINGTON, 1994 in "Parameter Estimation and Tissue Segmentation from Multispectral Images" in IEEE Trans. on Medical Imaging, vol. 13, No. 3, September 1994, pp 441–449.

Figure 1A:
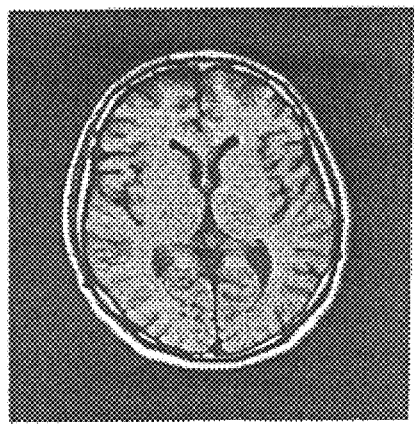
FIGS. 1A and 1B show two examples of images of a human brain obtained by different acquisition means.
Figure 1B:
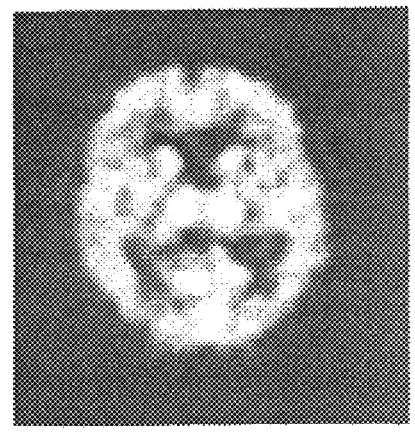
Figure 2A:
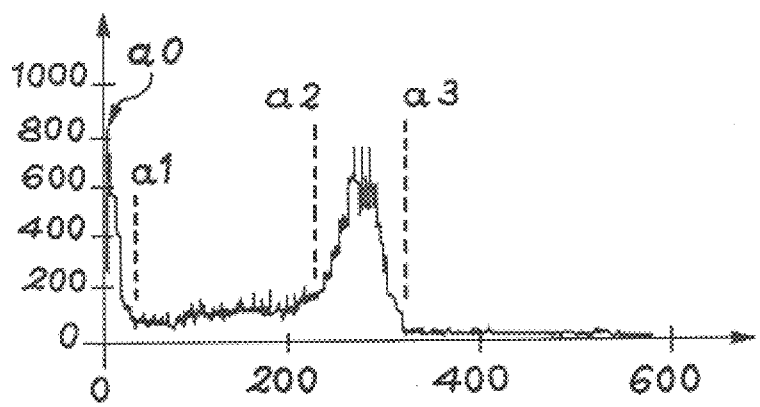
FIGS. 2A and 2B show the histograms of the grey levels of the images of FIGS. 1A and 1B.
Figure 2B:
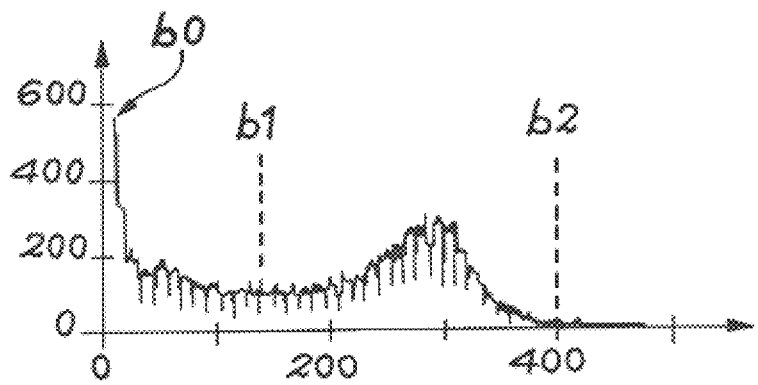

FIGS. 2A and 2B show the histograms of grey levels of the images of FIGS. 1A and 1B respectively. For the histogram of FIG. 2A, the chosen thresholds can be a0, a1, a2 and a3 and for the histogram of FIG. 2 the thresholds can be b0, b1 and b2.

The third stage of the process according to the invention 14 is a stage of breaking down the images I1 and I2 into different components, established on the basis of thresholds determined in stage 12. In particular, each image I1 and I2 is broken down into a group of components (if the number of chosen thresholds for an image is n, then the number of components of said image is n−1). Each of these components is defined with reference to a top threshold and a bottom threshold. Thus, for each image I1 and I2 is obtained a group of thresholded images. The values of the pixels of these thresholded images are defined in the following way:

a constant, e.g. 0, if the grey level of the pixel in the initial image is not in the range (bottom threshold, top threshold) and FONC (grey level-pixel) if the grey level of the pixel in the initial image is in the range (bottom threshold, top threshold). This FONC function can be a random, non-zero function and in particular the function of constant value 1, or the identity function.

The process according to the invention is continued with a phase registration buffer calculation stage 16 for each pair of components of the images I1 and I2. The term registration buffer is used for defining a multidirectional, sampled storage area, where essentially all the possible solutions are accumulated.

This stage 16 consists of:

16a) forming pairs of components (C1, C2), where C1 is a member of the group of components of the image I1 and C2 a member of the group of components of the image I2.

According to an embodiment of the invention, all the pairs of possible components are determined in said stage 16a.

According to another embodiment, a single component pair is determined in stage 16a. The following operations of stage 16 are then applied to said pair. Then a new pair of components will be determined and to it will be applied stages 16a to 16f and so on:

16b) performing the Fourier transform for each component of the pair of components, 16c) calculating a phase image for each component of the pair of components (C1, C2), 16d) calculating, for each pair of components, the difference between the two phase images which have been calculated and which are associated therewith, 16e) determining a complex image M of said phase difference or an image representing its modulus and its real part, 16f) performing the inverse Fourier transform of the complex image M in order to obtain an offset image stored in the registration buffer.

In the case of an elementary translation, said stage 16 corresponds to the application of the previously described phase translation registration method.

It should be noted that this stage 16 has been described for the case of a translation. Thus, the transform applied is the Fourier transform. However, more generally, the transform to be applied is a transform making it possible to pass each component of the pair from the space range to the dual frequency range.

The process according to the invention then comprises a stage 18 of summating all the offset images contained in the registration buffers for determining, in an overall buffer, a total offset image.

Finally, the process according to the invention has a stage 20 of seeking the maximum value in the total offset image. This maximum value corresponds to the maximum grey level in the image, which gives the translation in x and y of the image I1 in the reference marking of the image I2. This seeking of the maximum in the total offset image consists of calculating the geometrical transformation making it possible to superimpose the images I1 and I2 in the same reference marking, said geometrical transformation being determined on the basis of the coordinates of the maximum value pixel.

In the conventional case where the search for the offset is a translation search on bidimensional images, the total offset image is of dimension 2 and the coordinates of the maximum represent in x the translation in direction X defined in pixels and in y the translation in direction Y, also defined in pixels.

According to an embodiment of the invention, the process can be performed for more complex transformations than a translation between two images. It can in particular be used for an application in rotation. In this case, the Fourier transform of stage 16 is replaced by a Fourier-Mellin transformation, which makes it possible to calculate the scale and the rotation between two images.

In addition, a rotation of images (one of the two images) before the phase can be carried out. In this case, different rotations are applied to image I1 and a registration takes place between each rotated image I1 and the image I2 using the previously described, phase registration method, which makes it possible to generate a registration buffer for each rotation. The final transformation is found by seeking the maximum of a group of registration buffers. The buffer containing said maximum then defines the rotation between the images, whilst the translation is defined by the position of the maximum in said buffer.

The process according to the invention can also be applied to elastic transformations, which make it possible to model the deformations of an object. In this case, the elastic movement is modelled by the composition of a group of local, rigid transformations. The calculation of each local, rigid transformation then takes place by the phase registration method in translation and optionally in rotation.

The geometrical transformation, as determined in stage 20 of the process according to the invention, can be used directly or indirectly. Thus, the geometrical transformation determined by the process can directly constitute the information sought by the user, namely the movement of an object relative to a camera. It can also be applied to one of the images I1 or I2, so as to present the two images I1 and I2 in the same geometrical reference marking, so as to facilitate use or interpretation of the images by the user, which is the case in the examples of brain images of FIGS. 1A and 1B.

It should be noted that throughout the description of the process according to the invention given hereinbefore, processing has taken place for rigid displacements in the form of integral multiples of the size of the pixels. In other words, the precision obtained with the process, as described hereinbefore, is of the order of the length of the pixel. However, this precision can be improved by using an oversampling method such as the zero-padding transformation method. The zero-padding transformation method consists of enlarging the image of phase differences (stage 16d) with 0 to the outside, which makes it possible to obtain, at the end of the inverse Fourier transform calculation, an image having a resolution less than the starting images, i.e. an image whose precision is less than the size of the pixel.

Figure 5:
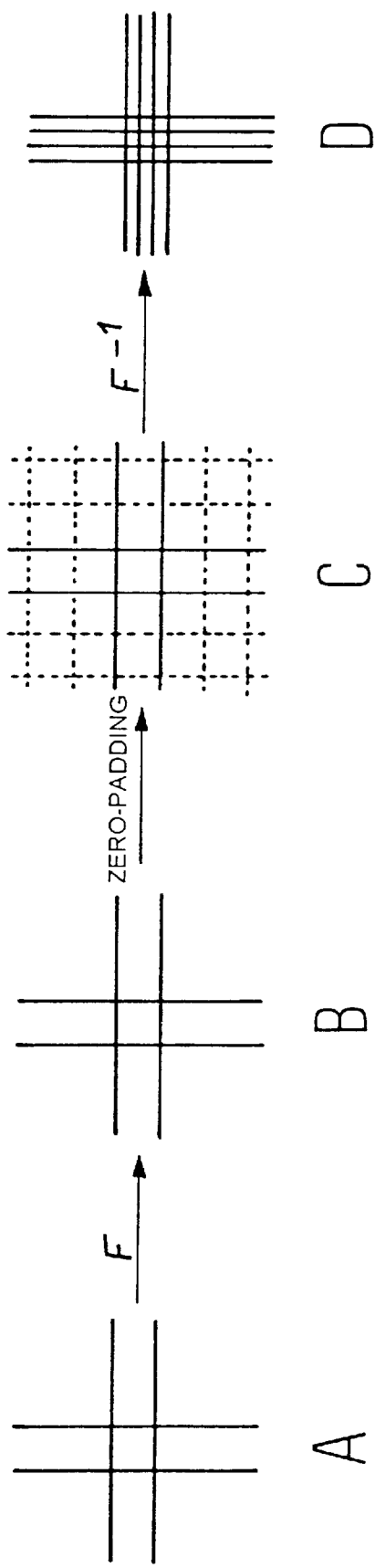
FIG. 5 diagrammatically shows an example of an image obtained in the case where use is made of the zero-padding method.

FIG. 5 represents the four stages of the said zero-padding method for an image representing a type of double cross. Part A of FIG. 5 represents an image prior to the Fourier transform, part B the same image after a transformation by Fourier transform, part C the phase difference image on which has been added 0 all around the double cross (object of the image) and part D the final image obtained after transformation by inverse Fourier transform. As can be seen in part D of FIG. 5, the precision for this example has been improved by approximately a coefficient 3.

It should be noted that the process according to the invention can be applied to both bidimensional images and to three-dimensional images.

The process according to the invention has the advantage of being noniterative, which permits a roughly constant calculation time. For stages 12 and 14, this process does not have to have a particularly good segmentation quality, the result of the registration obtained being quasi-independent of the quality of the segmentation, i.e. of the breaking down of the images into components. Thus, a slightly different choice of thresholds evolves the extracted components, but does not significantly influence the final result, the estimate of the rigid transformation remaining quasi-identical.

What is claimed is:

1. A process for the determination of a geometrical transformation between two different images I1 and I2, each constituted by image pixels and representative of the same object, with a view to a superimposing of said two images, comprising the following steps:

E13) segmenting each of the images into different components and deducing therefrom for each image, a group of thresholded images, E16) registering the thresholded images by a phase-based bringing into correspondence of each image:

16a) by taking, in a group of thresholded images corresponding to the image I1 and in a group of thresholded images corresponding to the image I2, respectively, first and second thresholded image components constituting a first and a second component of a pair of components, 16b) carrying out a transform T for passing each component of the pair of a space range to a dual frequency range, 16c) calculating a phase image for each component of the pair, 16d) calculating, for each pair, a difference between two phase images of the two components of the pair and deducing therefrom a phase difference image, 16e) determining an inverse transform $T^{-1}$ of the transform T of said phase difference image for determining an offset image and 16f) performing the stages 16a to 16e for each pair of components, E18) summating all the offset images obtained in 16e for determining a total offset image and E20) determining, in each total offset image, a pixel having a maximum value, coordinates of said pixel fixing parameters of the geometrical transformation between the two images I1 and I2.

2. The process according to claim 1, wherein, when the geometrical transformation is a translation, the transform T is a Fourier transform.

3. The process according to claim 1, in which the geometrical transformation consists of a rotation and a scale change, wherein the stages 16a and 16e comprise the steps of applying a Fourier-Mellin transform to a group constituted by a rotation and a scale change and associating it with a Haar measure for determining rotation and scale change parameters.

4. The process according to claim 1, in which the geometrical transformation consists of a translation and a rotation, wherein stages 16a and 16e comprise the step of applying an elementary Fourier transform associated with a rotation of the images.

5. The process according to claim 1, further comprising extending the phase difference images by a zero-padding method in order to increase a precision of the parameters determined in stage E20.

6. The process according to claim 1, wherein the segmentation E13 of the images takes place as a function of grey levels of the images, said segmentation comprising the steps of:

E12) determining, for each image, a histogram of the grey levels of the image and choosing, among said grey levels, n grey level thresholds for each image, with $n \geq 2$, E14) breaking down each of the images as a function of its n grey level thresholds and deducing therefrom, for each image I1 and I2, a group of $n^{-1}$ thresholded images.

* * * * *